March 6, 1951     W. J. LE COUNT     2,544,633
EXPANSIBLE MANDREL
Filed Sept. 19, 1945
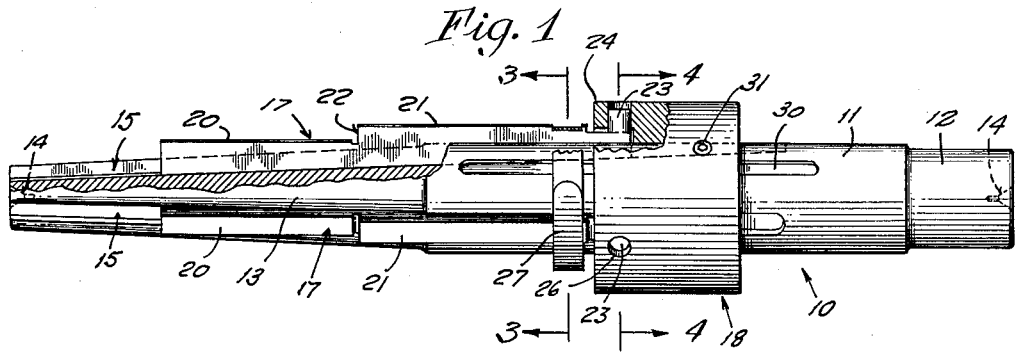
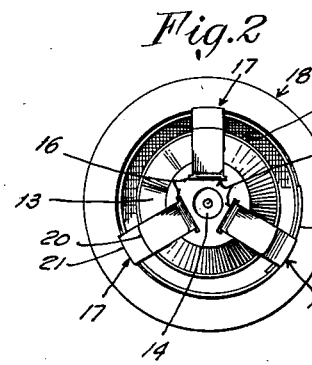 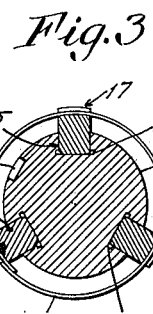 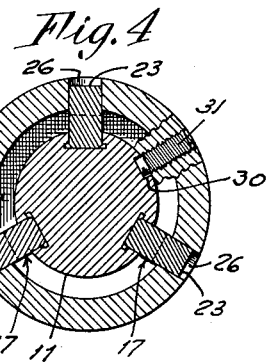
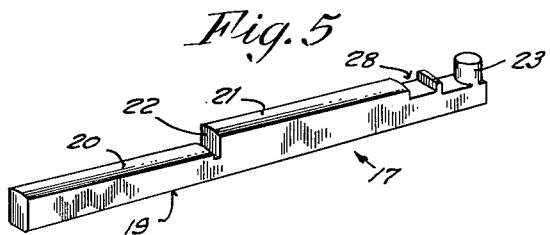
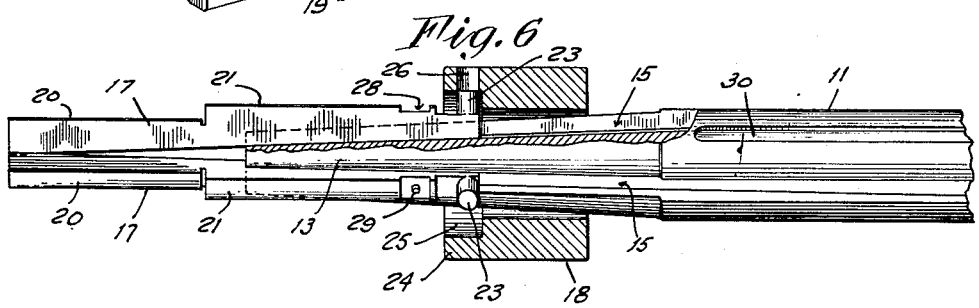
INVENTOR
William J. LeCount
BY Johnson & Kline
ATTORNEYS Patented Mar. 6, 1951

2,544,633

UNITED STATES PATENT OFFICE 2,544,633

EXPANSIBLE MANDREL

William J. Le Count, Norwalk, Conn., assignor to Mary J. Le Count, doing business as W. G. Le Count Tool Works, South Norwalk, Conn.

Application September 19, 1945, Serial No. 617,207

1 Claim. (Cl. 82—44)

This invention relates to improvements in expansible mandrels.

Heretofore, expanding type mandrels have been made with the keys or chucking jaws carried in divergent dovetail grooves in the shanks, the keys being slidable in said grooves, and being under the control of a sleeve or collar on the shank having a threaded connection with the latter so that the jaws could be slowly forcibly expanded for gripping a workpiece.

In order to provided for faster operation of this type tool, and to reduce the cost, a mandrel has been proposed wherein the operating sleeve is not threaded to the shank but is freely slidable thereon, and wherein the keys and grooves are not dovetailed, but are provided with straight side walls, the keys being connected to the sleeve by individual springs which furnish both the driving connections and the means for maintaining the keys in the grooves.

While this latter construction has in general accomplished the objective sought, this has been done at the expense of accuracy and precision, since the keys were loosely held by the springs and therefore were movable to some extent with respect to the sleeve and to one another. As a result, it was not possible to consistently do precision work with this newer type of device.

According to the present invention the difficulties and drawbacks of this later construction have been overcome, while still retaining simplicity and economy of manufacture, and retaining the quick-action of the keys or jaws. This has been accomplished by the provision of a novel structure wherein the slidable sleeve and the keys controlled thereby have simple but positive and close-fitting slidable driving connections which are so arranged as to permit the necessary relative working movements of the parts, and to prevent all lost motion or other relative movements which would adversely affect the accuracy of the tool.

In the preferred form of the invention which is illustrated herein, the driving connections between the keys and the sleeve comprise pins in the former, closely fitting and slidable in apertures in the latter. These connections are easily and economically produceable, and highly accurate, so that close control over the movements of the keys is had, the driving connections effecting simultaneous expansion and contraction, and therefore perfect concentricity of the work.

In conjunction with the precisely connected sleeve and keys, novel and simple spring means are provided for yieldably holding the keys deeply seated in the grooves at all times, thereby preventing dirt, chips, etc., from getting under the keys and misaligning the latter to throw the work out of concentricity, and also maintaining the keys in their proper operative positions at the times that the mandrel is being adjusted and work is installed or removed.

Due to the elimination of the threads between the operating sleeve and the shank, the movable parts of the mandrel are quickly freely slidable conjointly to any adjusted position, and are held in adjusted position by the friction effected by the force which the spring means is able to exert. As a result the operation of setting up a workpiece may be quickly and conveniently carried out.

Novel and simple stop means are provided between the shank and the operating sleeve to limit the axial movement of the latter, the limits being so set that inadvertent disassembly of the keys from the mandrel is prevented at all times unless the stop means is made inoperative, in which case by sliding the sleeve beyond its normally limited position the keys may easily and quickly be removed for cleaning purposes and the devices by reverse procedure, may be quickly reassembled.

Other features and advantages will hereinafter appear.

In the accompanying drawings:

Figure 1 is a side elevation, partly in section, of an expansible mandrel made according to the invention.

Fig. 2 is a left end view of the mandrel.

Fig. 3 is a transverse section taken on the line 3—3 of Fig. 1.

Fig. 4 is a transverse section taken on the line 4—4 of Fig. 1.

Fig. 5 is a perspective view of one of the chucking elements or keys, and

Fig. 6 is a view of the mandrel partly in section and partly in side elevation, showing the manner of assembly.

Referring to Fig. 1, the expansible mandrel of this invention comprises a shank 10 having a cylindrical body portion 11, one end of which is integral with a cylindrical mounting portion 12 of reduced diameter, the other end of the body portion having an integral tapered extension 13. The ends of the shank 10 may be provided with the usual conical recesses or centers 14 as indicated.

Referring to Figs. 1, 2 and 6, the tapered portion 13 and body 11 of the shank are provided with a plurality of rectangular grooves 15 extending along an angle longitudinally of the shank and approaching the axis of the latter so that the grooves are convergent, i. e., if extended beyond the small end of the shank they would meet at a theoretical point lying in the axis of the shank.

As shown in Fig. 2, three such grooves 15 may be provided, each 120° apart from the other two, and the walls of the grooves may be advantageously formed with undercuts along the corners, indicated at 16, for the purpose of eliminating fillets at these points.

According to the present invention novel keys or jaws, and operating means therefor are provided to be carried in the grooves 15 on the shank 10, for the purpose of mounting workpieces having bores of different diameters on the mandrel to perform machining operations. These means comprise novel keys 17 adapted to be slidably received in the convergent or divergent grooves 15 of the shank, and comprise a novel operating sleeve 18 slidably carried by the shank for cooperation with the keys 17 to effect expanding and contracting adjusting movement of the latter.

Each key 17 has an unbroken wedging undersurface 19 for engagement with the bottom of one of the grooves 15, and opposite the undersurface 19 has a pair of convex work-engaging surfaces 20 and 21 extending at an angle to the surface 19, the surface 21 being offset outwardly from the surface 20, thereby forming a shoulder 22.

The edges of the undersurface 19 of the keys are chamfered as shown in Figs. 3 and 5 and cooperate with the undercuts 16 to prevent any binding therebetween and insure that the keys which are radially insertable will always engage the bottom of the grooves.

When the keys 17 are carried in the grooves 15 of the shank 10, the work-engaging surfaces 20 will be in corresponding locations, and therefore comprise jaws for gripping work of small bore-diameter, and the surfaces 21 comprise jaws for gripping work of larger bore-diameter.

For the purpose of closely and accurately coordinating the movements of the keys 17 in expanding or contracting, each key at one end has a cylindrical lug or pin 23, extending in a direction which is substantially radially outward when the keys are being carried in the grooves 15 of the shank. The sleeve 18 is adapted to effect the said coordination of movement of the keys 17, and to enable quick and convenient adjustment of the keys, and for this purpose the sleeve is made to slidably fit the cylindrical body portion 11 of the shank 10, one end 24 of said sleeve having an enlarged bore 25 being adapted to encircle and overlie the pin-bearing ends of the keys 17, said sleeve also having a plurality of apertures 26 which slidably receive the pins 23 and thereby provide a sliding driving connection to the latter. Thus, when the sleeve 18 is moved axially on the shank 10 the keys 17 will be simultaneously moved in the grooves 15, and due to the convergent-divergent direction of the grooves and the slope of the wedging surfaces 19 of the keys, the latter will, in following the grooves be moved radially inward or outward.

As shown in Fig. 6, the keys 17 may be readily assembled to the shank 10 and sleeve 18 by supporting the latter approximately midway on the tapered portion 13 of the shank, and fitting the pins 23 of the keys individually into different apertures 26. The sleeve 18 and keys 17 may then be simultaneously moved to bring the sleeve to bear on the cylindrical body 11 of the shank, whereupon the keys 17 will be retained in place because of the insufficient clearance existing inside of the sleeve 18 to permit their removal.

According to this invention novel and simple spring means are provided for yieldably maintaining the keys 17 fully nested in the grooves 15 at all times, thereby preventing dirt from lodging under the keys to cause misalignment of same, and yieldably holding the parts of the mandrel in any adjusted position during installation or removal of the work. This means comprises an expansible coil spring 27 encircling the keys 17 adjacent the sleeve 18, the coil spring occupying spring-receiving notches 28 cut in the surfaces 21 of said keys.

Preferably, as shown in Fig. 3, one of the keys 17 is provided with a pin 29 located in the notch 28 and extending outwardly thereof, and the inner end of the spring 27 is apertured to receive the pin 29 so as to be anchored thereby to the key. The expansible spring 27 normally yieldably holds the keys 17 so that the latter are deeply, fully nested in the grooves 15 regardless of the operative position of the keys and sleeve 18.

According to the present invention simple stop means are provided for limiting the movement of the sleeve 18 on the shank 10 after the parts have been assembled, so as to prevent inadvertent disassembly of the parts. This stop means comprises a sleeve-controlling groove 30 extending longitudinally in the cylindrical portion 11 of the shank, and a dog-point set screw 31 carried by the sleeve 18 so that the point thereof extends into the groove 30. Thus, engagement of the point of the screw 31 with the ends of the groove 30 prevent the sleeve 18 from being rotated and removed from the body portion 11 of the shank, and thereby prevent the keys 17 from inadvertently dropping out, since the pins 23 may not leave the apertures 26.

In operation, referring to Fig. 1, if the sleeve 18 should be moved to the left on the shank 10, the keys 17 will precisely coordinately move simultaneously therewith, and due to the pressure of the spring 27, will follow the slope of the grooves 15 so as to cause the working surfaces 20, 21 of the keys to correspond to smaller diameters. Conversely, if the sleeve 18 is moved to the right, considering Fig. 1, the keys 17 will precisely move simultaneously therewith, and due to the slope of the grooves 15 be forced outwardly so that the working surfaces 20, 21 correspond to larger diameters.

Thus workpieces having a wide variation of bore diameter may be accurately supported for machining operations on the mandrel, and either the surfaces 20 or the surfaces 21 may be employed to grip the bore of the work.

If desired, the screw 31 may be employed to lock the mandrel parts in work-supporting position by tightening the screw against the bottom of the groove 30.

When it is desired to release a workpiece from the mandrel, a hammer blow on the sleeve 18, to shift the latter to the left, will cause the keys 17 to move in a contracting direction, thus enabling an operator to easily remove the loosened work.

The expansible coil spring 27 may be made of comparatively heavy strip stock so that the force exerted on the keys 17 is of substantial magnitude, thereby firmly holding the latter deeply in the grooves 15 and preventing dirt from getting underneath the keys to cause misalignment, and cause lack of concentricity in the work.

Due to the force of the spring 27 there is obviated the necessity of making the keys and grooves with sloping tongue-and-groove walls. As a result, the fabrication of the present expansible mandrel may be economically carried out.

Because of the friction of the keys 17 in the slots 15, due to the contractible force of the spring 27 the parts of the mandrel will stay in any adjusted position, therefore making it convenient for an operator to assemble or disassemble work on the mandrel.

By the provision of the pins 23 which are slidable in the apertures 26 of the sleeve 18, the use of sleeves having internal grooves and the like, which tend to collect chips and dirt, and clog the tool, is eliminated. Thus the likelihood of the mandrel jamming or becoming inaccurate is minimized.

If it is desired to dismantle the tool of the invention, as for cleaning purposes, this may be quickly and conveniently accomplished by loosening the screw 31, and sliding the sleeve 18 and keys 17 to the left, off the shank 10. The keys are then readily removable and easily cleaned, and the grooves 15 in the shank also accessible for cleaning. Reassembly of the tool is accomplished as previously described.

Variations and modifications may be made within the scope of this invention and portions of the improvements may be used without others.

I claim:

An expansible mandrel comprising a shank having a plurality of convergent grooves extended longitudinally therein having the bottom and each side wall joined to provide an unobstructed angle and a sleeve-controlling groove at one end thereof; radially insertable keys slidably carried in said grooves, said keys having straight unobstructed sides and rounded lower edges and having pins at corresponding locations at one end thereof, extending radially outward and having spring-receiving notches in their outer surfaces near the said pins; a sleeve slidably carried on the shank and having means engaging said sleeve-controlling groove for limiting the sleeve to axial movement and having a portion encircling and clearing the keys at said pins, said sleeve having apertures adapted to slidably receive the pins so that a driving connection is maintained between the sleeve and the keys during movement of the latter and axial movement of the sleeve on the shank while said keys are held against lateral play in said groove by the cooperation of the pins and apertures; and an expansible spring encircling the said keys and occupying the spring-receiving notches thereof, said spring yieldably maintaining the keys in position within the grooves and pressing said keys into engagement with the bottoms of said grooves as permitted by the rounded edges whereby to prevent the entrance of foreign matter between the keys and the bottoms of said grooves and at the same time prevent radial play between the keys and grooves.

WILLIAM J. LE COUNT.

REFERENCES CITED

The following references are of record in the file of this patent:

UNITED STATES PATENTS

| Number | Name | Date |
|---|---|---|
| 198,633 | Le Count | Dec. 25, 1877 |
| 331,167 | Taylor | Nov. 24, 1885 |
| 480,435 | McGraw | Aug. 9, 1892 |
| 1,186,429 | Nicholson | June 6, 1916 |
| 1,448,528 | Elliott | Mar. 13, 1923 |

FOREIGN PATENTS

| Number | Country | Date |
|---|---|---|
| 36.305 | Austria | Feb. 25, 1909 |
| 120,134 | Great Britain | Oct. 31, 1918 |